No. 757,582.

Patented April 19, 1904.

UNITED STATES PATENT OFFICE.

HEINRICH WACHWITZ, OF HERSBRUCK, NEAR NUREMBERG, GERMANY, ASSIGNOR, BY DIRECT AND MESNE ASSIGNMENTS, TO THE WACHWITZ PATENTS SYNDICATE, LIMITED, OF LONDON, ENGLAND.

PROCESS OF WELDING STEEL PLATES, &c., TO SHEETS OF ALUMINIUM AND ALUMINIUM-PLATED OTHER METALS.

SPECIFICATION forming part of Letters Patent No. 757,582, dated April 19, 1904.

Application filed May 6, 1903. Serial No. 155,847. (No specimens.)

*To all whom it may concern:*

Be it known that I, HEINRICH WACHWITZ, a subject of the King of Bavaria, and a resident of Hersbruck, near Nuremberg, Bavaria, Germany, have invented certain new and useful Improvements in Processes of Welding Steel Plates and the Like to Sheets of Aluminium or other Metals Plated or Coated with Aluminium; and I do hereby declare the following to be a full, clear, and exact description of my invention, such as will enable others skilled in the art to which it appertains to make and use the same.

My invention relates to an improved process for welding metal plates or bodies of metal, principally steel, to sheets, plates, or bodies of aluminium or other metals covered with aluminium.

My process is as follows: A sheet of aluminium or of any other metal coated with aluminium is cleaned on its aluminium side and placed with the latter on the surface of the steel plate or other metal to be plated, also previously cleaned. Then the metal sheet to be welded is fixed to the steel plate by means of wires in order to prevent the metals from being displaced. After this the metals fixed together are placed into a furnace moderately heated, in which they are heated until the welding temperature of aluminium, at which temperature iron or steel to be plated becomes blue on its surface. If the steel plates or bodies were overheated, they would oxidize, thus preventing the union of the metals to be welded. The metals treated as aforesaid are then subjected to pressure by means of rolls or other suitable appliances, whereby the sheet of aluminium or other metal plated with aluminium and the steel or other metal plates are so far united as not to be liable to oxidation of their junction when subjected to further heat. This compound plate or body is then placed into a second furnace heated to a higher degree, therein heated near to the melting-point of the metal to be welded on the steel or other metals, and is welded by rolling or other suitable pressure.

My improved process has the advantage that it is unnecessary to cover the steel plate with aluminium before being welded, as heretofore was necessary.

Having now fully described my invention, what I claim is—

A process for welding plates or bodies of steel or other metals which are liable to slow oxidation when being heated, to sheets, of aluminium or other metals plated with aluminium, consisting in cleaning the surfaces of the aluminium or aluminium coating and of the steel plate, or other metal plate which surfaces are subsequently to be placed in juxtaposition placing the metal to be welded upon the steel plate or other metal plate, heating them to a moderate temperature and uniting them by a suitable pressure by means of rolls or other appliances sufficiently to prevent oxidation of the junction when being further heated, then further heating the compound plate close to the melting-point of the metal plated upon the steel or other plate, and welding the same by rolling or other pressure in this state.

In testimony whereof I affix my signature in presence of two witnesses.

HEINRICH WACHWITZ.

Witnesses:
ALEX WIELE,
MAX SCHNEIDER.